(12) United States Patent
Henson

(10) Patent No.: US 10,264,726 B2
(45) Date of Patent: Apr. 23, 2019

(54) FREQUENCY OF CLIP CONTROL SYSTEM

(71) Applicant: Deere & Company, Moline, IL (US)

(72) Inventor: Robert A. Henson, Apex, NC (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/488,878

(22) Filed: Sep. 17, 2014

(65) Prior Publication Data

US 2016/0073579 A1    Mar. 17, 2016

(51) Int. Cl.
*A01D 34/44* (2006.01)
*A01D 34/58* (2006.01)

(52) U.S. Cl.
CPC ............. *A01D 34/58* (2013.01); *A01D 34/44* (2013.01)

(58) Field of Classification Search
None
See application file for complete search history.

(56) References Cited

U.S. PATENT DOCUMENTS

| | | |
|---|---|---|
| 5,394,678 A | 3/1995 | Lonn et al. |
| 5,497,604 A | 3/1996 | Lonn |
| 5,657,224 A | 8/1997 | Lonn et al. |
| 6,339,916 B1 | 1/2002 | Benson |
| 6,487,837 B1 | 12/2002 | Fillman et al. |
| 6,523,334 B1 | 2/2003 | Dettmann |
| 6,758,030 B2 | 7/2004 | Dettmanm |
| 6,802,175 B2 | 10/2004 | Fillman et al. |
| 7,007,446 B2 | 3/2006 | Dettmann |
| 7,168,227 B2 | 1/2007 | Derby et al. |
| 7,367,173 B2 | 5/2008 | Daly et al. |
| 7,434,642 B2 | 10/2008 | Dettmann |
| 7,610,738 B2 | 11/2009 | Daly et al. |
| 7,954,308 B2 | 6/2011 | Harris |
| 8,261,523 B2 | 9/2012 | Patton |
| 8,621,833 B2 | 1/2014 | Shida et al. |
| 2005/0072132 A1* | 4/2005 | Dettmann ............ A01D 34/58 56/10.8 |
| 2006/0196159 A1* | 9/2006 | Daly .................... A01D 34/006 56/7 |
| 2009/0188225 A1* | 7/2009 | Harris .................. A01D 34/58 56/10.2 H |
| 2011/0224845 A1* | 9/2011 | Perry ..................... B64F 1/22 701/2 |
| 2011/0232253 A1* | 9/2011 | Lingle ................... A01B 45/00 56/249 |
| 2015/0351318 A1* | 12/2015 | Iyasere ................ A01D 34/006 56/10.2 A |

* cited by examiner

Primary Examiner — Nicholas K Wiltey

(57) ABSTRACT

A frequency of clip control system includes a vehicle controller receiving an output from a ground speed user interface for a requested ground speed, and an output from a frequency of clip user interface for a requested frequency of clip. The vehicle controller sets the speed of an electric reel motor based only on the requested ground speed, the requested frequency of clip, and parameters of the cutting unit including the number of cutting blades of the cutting reel and reel motor to reel speed ratio.

14 Claims, 6 Drawing Sheets

FREQUENCY OF CLIP CONTROL SYSTEM

FIELD OF THE INVENTION

This invention relates generally to reel mower cutting units, and specifically to a frequency of clip control system.

BACKGROUND OF THE INVENTION

Grass mowing machines for golf courses and other turf areas typically include one or more reel mower cutting units to provide an accurate, high quality cut. Each reel mower cutting unit includes a generally cylindrical reel that has a plurality of blades which rotate in close proximity to a stationary bedknife fixed with the frame of the cutting unit. Grass is cut by a shearing action between the bedknife and the rotating blades of the cutting reel.

Walk behind greensmowers typically include a ground engaging traction drum that propels the mower while mowing. The traction drum may be driven through a mechanical or hydraulic transmission connected to an internal combustion engine, electric motor, or other power source. The reel cutting unit may be driven by a hydraulic or electric motor.

Some walk behind greensmowers have reel cutting units that are driven by mechanical gears which in turn are driven by traction drive wheels at a fixed ratio such that the faster the ground speed, the faster the reel speed. For example, U.S. Pat. No. 8,261,523 for Clip Control System for Walk Reel Mower relates to a toothed timing belt entrained around three toothed pulleys that may be switched to different positions to change the clip rate.

Other walk behind greensmowers have reel mower cutting units that are driven by hydraulic motors, or cutting units driven by electric reel motors powered by batteries or an alternator driven by an internal combustion engine. Similarly, riding greensmowers and fairway mowers may include a vehicle with a traction drive system powered by an internal combustion engine, batteries or other power source. The vehicle may carry several reel mower cutting units, each powered by a hydraulic or electric reel motor.

Frequency of clip generally is measured by the distance the grass mowing machine travels forward before the next blade reaches the bedknife. Different climates, grasses and weather conditions require different clip frequency settings for ideal maintenance. In most cases, a single machine may be used to mow multiple areas on a golf course, but it can be difficult and time consuming to adjust the clip frequency.

To maintain a requested frequency of clip, the ground speed and the reel motor speed both may be constant. For example, U.S. Pat. No. 6,339,916 for Method for Constant Speed Control for Electric Greens Mower relates to an electric greensmower that includes a constant speed control mechanism.

Alternatively, a requested frequency of clip may be maintained by using a sensor to monitor the actual ground speed in a closed loop control system. The monitored ground speed may be provided as feedback to control the reel motor speed. For example, U.S. Pat. No. 5,394,678 for Electronic Control for Turf Maintenance Vehicle and U.S. Pat. No. 5,657,224 for Turf Maintenance Vehicle Diagnostics and Parameter Condition Logger relate to a controller that controls the speed of the reels by providing a pulse width modulated signal to valves of hydraulic reel motors. Ground speed is determined by measuring the rotation of a transmission gear driving the wheels, and a look-up table is used to determine a set point for reel speed. U.S. Pat. No. 5,497,604 for Supervisor Switch for Turf Mower has a controller that monitors ground speed of the mower, determines if the speed is approaching a maximum mowing speed, and actuates a warning to alert the operator if the maximum mowing speed is being approached or exceeded.

Similarly, U.S. Pat. No. 7,168,227 for Internal Combustion Engine Traction Drive With Electric Cutting Unit Drive For Walking Greens Mower relates to a controller for varying the rotational speed of an electric motor for the cutting reel based on output signals from a sensor coupled to at least one of the rollers, which the controller uses to determine the drive speed of the greens mower. U.S. Pat. Nos. 7,367,173 and 7,610,738 for Greens Mower Data Display and Controller relate to a vehicle controller that actively controls the electric reel motor based on a programmable vehicle clip rate data input and the monitored vehicle groundspeed. U.S. Pat. No. 7,954,308 for Frequency Of Clip Adjustment System And Method For Reel Mower Cutting Unit relates to a reel motor controller that provides a rotational speed to an electric reel motor based on the alternator voltage, voltage output from a user interface, an engine to traction roller ratio, a traction roller circumference and number of blades of the cutting reel. U.S. Pat. No. 8,621,833 for Lawn Mowing Vehicle With A Control Unit For The Motor controls the rotational speed of the electric reel using a speed detection unit detecting the travel speed of the vehicle and a control unit that controls the electric reel motor depending on the detected result of the speed detection unit.

Alternatively, the ground speed and reel motor speed each may be set by the operator independently and without specifying the frequency of clip. U.S. Pat. Nos. 6,487,837 and 6,802,175 for Articularly Mounted Battery-Powered Walk-Behind Reel Lawnmower relate to a greensmower having an electrical system with a variable resistor controlled by the operator to adjust the traction speed. Another resistor may be connected with the reel motor, and may be under the control of the operator and variable so the rotation speed of the reel may be adjusted. Similarly, U.S. Pat. Nos. 6,523,334, 6,758,030, 7,007,446 for Battery-Powered Walk-Behind Greensmower, and U.S. Pat. No. 7,434,642 for Battery Tray And Wiring Harness For A Walk-Behind Reel Greensmower, relate to an electric reel motor that is controlled by a fixed control or a potentiometer so that reel rotation speed may be variable and under the direct control of the operator.

A frequency of clip control system is needed for walk behind greensmowers and riding greensmowers or fairway mowers that does not require a closed loop control system with a sensor to monitor actual ground speed.

SUMMARY OF INVENTION

The present invention provides a frequency of clip control system that provides a constant frequency of clip without ground speed feedback. The operator may set and change both the ground speed and frequency of clip using an operator interface. The operator interface provides an output to the vehicle controller corresponding to the requested ground speed and an output to the vehicle controller corresponding to the requested frequency of clip. The vehicle controller determines the requested traction motor speed and provides that speed to the traction motor controller. The vehicle controller also determines the requested reel speed based on requested ground speed, requested frequency of clip, and parameters of the cutting unit. The vehicle controller also determines the requested reel motor speed and provides that speed to the reel motor controller. The vehicle controller may change the reel motor speed based on the operator requested ground speed and frequency of clip without monitoring ground speed.

DESCRIPTION OF THE PREFERRED EMBODIMENT

Figure 1:
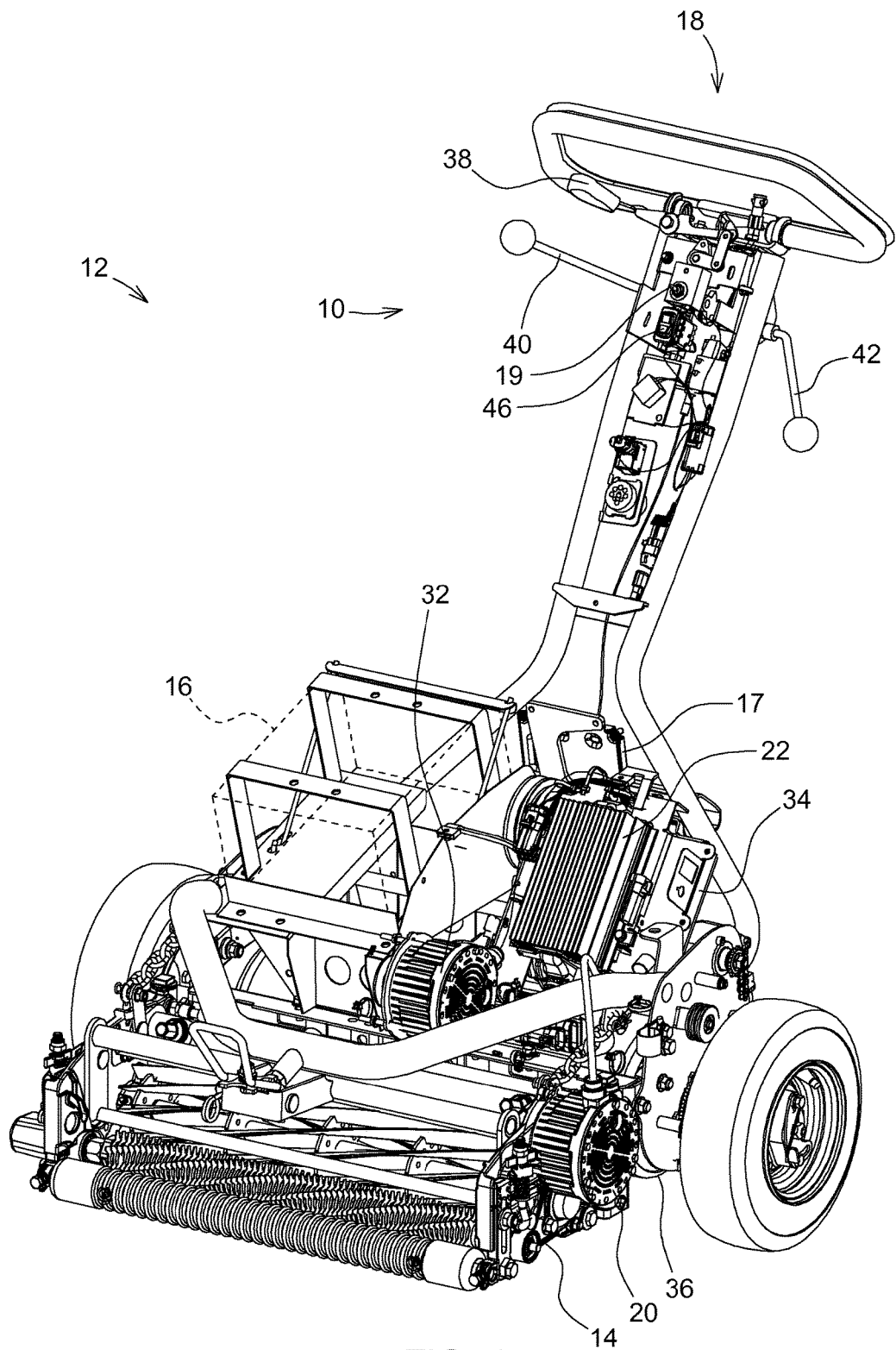
FIG. 1 is a perspective view of a walk behind greensmower with a frequency of clip control system according to a first embodiment of the invention.
Figure 2:
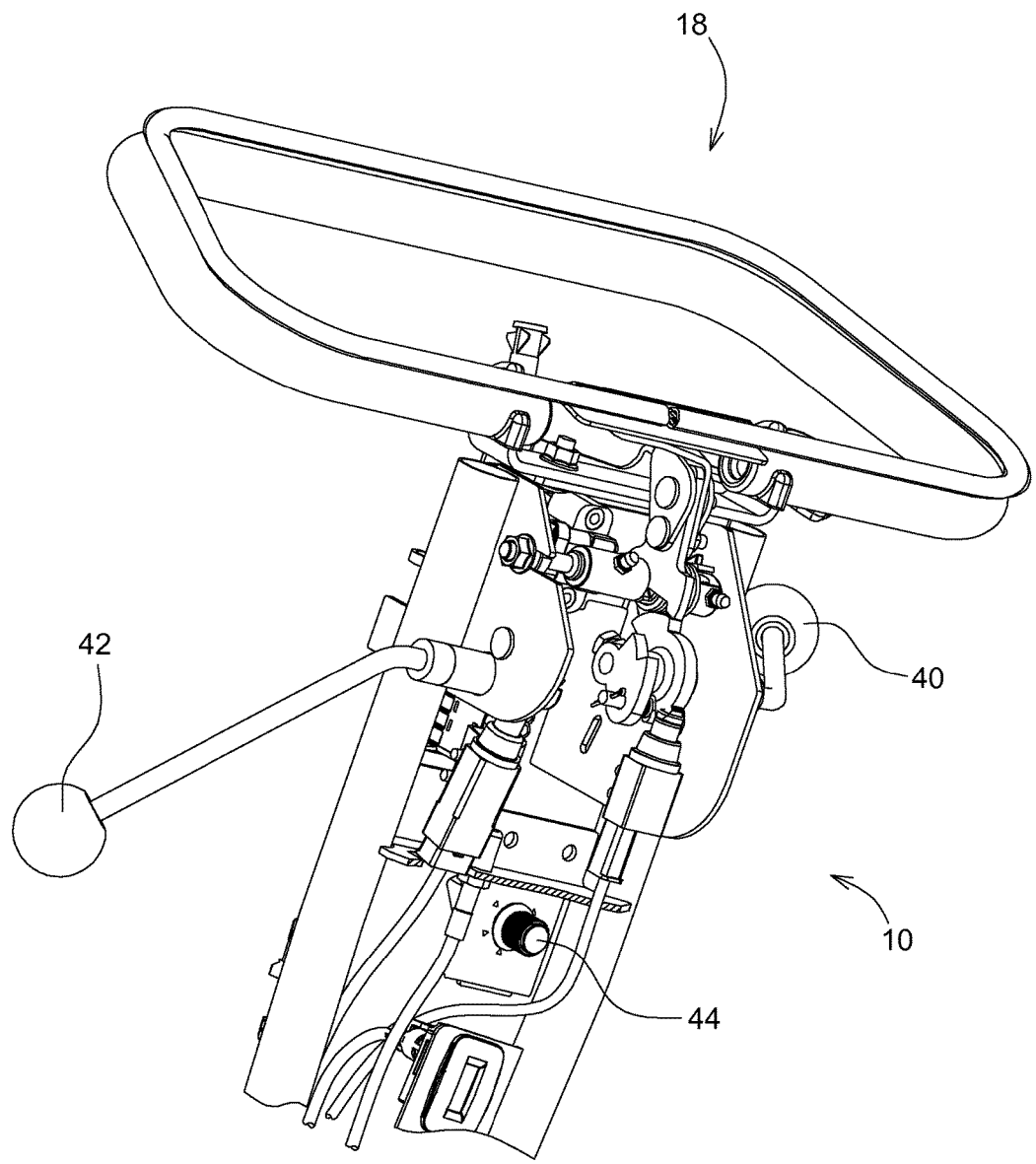
FIG. 2 is a perspective view of a handle assembly of a walk behind greensmower with a frequency of clip control system according to a first embodiment of the invention.
Figure 3:
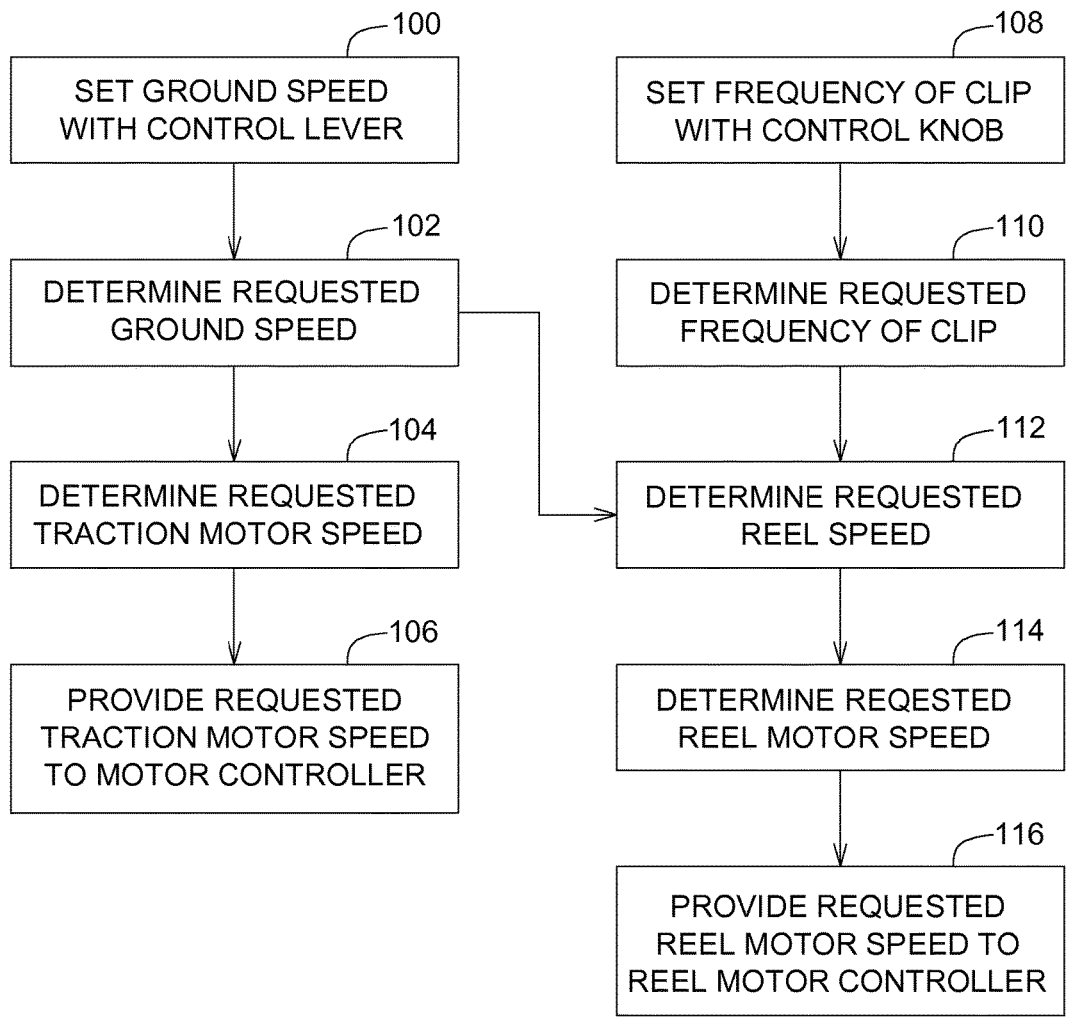
FIG. 3 is a block diagram of a frequency of clip control system on a greensmower according to a first embodiment of the invention.

In the embodiment of FIGS. 1-3, frequency of clip control system 10 may be provided on walk behind greensmower 12 having reel mower cutting unit 14 powered by electric battery pack 16 and connected to vehicle controller 17. The walk behind greensmower may include handle assembly 18 with power on switch 19 and operator controls described below.

In one embodiment, frequency of clip control system 10 may include one or more electric reel motors 20 and reel motor controllers 22. Each electric reel motor may be mounted to the left or right side of a reel motor cutting unit, and may be connected via electric cable to reel motor controller. The electric reel motor may rotate the blades of cutting reel 14 about a generally horizontal and laterally extending axis. Grass may be cut between rotating reel blades of the cutting reel and a bedknife mounted between the side panels.

In one embodiment, frequency of clip control system 10 may include electric traction motor 32 and traction motor controller 34. The electric traction motor may be mounted on the greensmower and may be connected via electric cable to the traction motor controller. The electric traction motor may rotate traction drum 36 to propel the machine forward. A belt or gear transmission having gear reduction may be provided between the electric traction motor and the traction drum.

In one embodiment, frequency of clip control system 10 may include a ground speed user interface such as ground speed control lever 38. The ground speed control lever may be mounted on or adjacent the handle and may include a potentiometer providing a variable voltage to vehicle controller 17. The operator may set the ground speed control lever to request a ground speed for traction motor 32. The vehicle controller then may provide a signal or command representing the requested ground speed to the traction motor controller. The frequency of clip control system also may include traction engagement lever 40 to engage or disengage the traction drive transmission and park brake lever 42 to hold the greensmower in a park position.

In one embodiment, frequency of clip control system 10 may include frequency of clip user interface such as frequency of clip control knob 44. The frequency of clip control knob may be mounted on or adjacent the handle and may include a potentiometer providing a variable voltage to vehicle controller 17. The operator may set the frequency of clip control knob to request a frequency of clip. The frequency of clip control system also may include reel enable or PTO switch 46 to electrically engage or disengage the reel drive.

FIG. 3 is a block diagram showing the vehicle controller logic for the frequency of clip control system of the greensmower of FIGS. 1 and 2. The vehicle controller may determine the reel speed that is needed for the requested frequency of clip and requested ground speed.

In one embodiment, in block 100, the operator may set a ground speed user interface such as ground speed control lever 38 to a requested ground speed position. The ground speed control lever may provide an output to the vehicle controller. For example, the ground speed control lever may include a potentiometer that can vary a voltage to the vehicle controller between a minimum of about 1 volt and a maximum of about 5 volts.

In a first embodiment, in block 102, the vehicle controller may determine the requested ground speed based on the output from block 100. For example, a walk behind greensmower may have a ground speed range between about 0 mph and about 3 mph. Optionally, the vehicle controller may map the output to one of several ground speed presets in a range between a minimum and a maximum. Alternatively, the vehicle controller may map the output to a ground speed that is infinitely variable between a minimum and a maximum.

In a first embodiment, in block 104, the vehicle controller may determine the requested traction motor speed based on the requested ground speed from block 102 and other parameters of the machine such as the transmission or gear reduction ratio. For example, the vehicle controller may determine the requested traction motor speed in revolutions per minute for a requested ground speed of 2.25 miles per hour determined in block 102, a traction drum circumference of 23.56 inches, and a traction motor to traction drum ratio of 19.68, as follows:

Required traction motor speed=(63360 inches per mile/60 min per hour)×2.25 miles per hour× 19.68/23.56 inches per revolution=1994 rpm In block 106, the vehicle controller may provide a signal for the requested traction motor speed to the traction motor controller.

In a first embodiment, in block 108, the operator may set the frequency of clip user interface or control knob to a requested frequency of clip position. The frequency of clip control knob may provide an output to the vehicle controller. For example, the frequency of clip control knob may include a potentiometer that can vary the voltage between a minimum of about 1 volt and a maximum of about 5 volts.

In a first embodiment, in block 110, the vehicle controller may determine the requested frequency of clip based on the output from block 108. Optionally, the vehicle controller may map the output to one of several frequency of clip presets in a range between a minimum and a maximum. For example, the vehicle controller may map the output to one of five or more frequency of clip presets between about 0.16 inches and about 0.48 inches for an eleven blade cutting reel. Similarly, the vehicle controller may map the output to one of five or more frequency of clip presets between about 0.251 inches and about 0.754 inches for a seven blade cutting reel. Alternatively, the vehicle controller may map the output to a frequency of clip that is infinitely variable between a minimum and a maximum.

In a first embodiment, in block 112, the vehicle controller may determine the requested reel speed based on the requested ground speed from block 102, the requested frequency of clip from block 110, and one or more other values specific to the reel mower cutting unit or variables entered by the operator, such as the number of reel blades on the cutting unit. For example, the vehicle controller may determine the requested reel speed of a walk behind greensmower in revolutions per minute using the following equation:

$$\text{Requested reel speed} = ((63360 \text{ inches per mile}/60 \text{ min per hour}) \times \text{requested ground speed}) / (\text{number of reel blades} \times \text{requested frequency of clip})$$

The requested reel speed based on a requested ground speed of 2.25 mph determined in block 102, a requested frequency of clip of 0.425 inches determined in block 110, and a cutting unit having 7 reel blades, is as follows:

$$\text{Requested reel speed} = ((63360 \text{ inches per mile}/60 \text{ min per hour}) \times 2.25 \text{ mph})/(7 \text{ blades} \times 0.425 \text{ inches}) = 799 \text{ rpm}$$

In a first embodiment, in block 114, the vehicle controller may determine the requested reel motor speed based on the requested reel speed from block 112 and the reel motor to reel speed ratio which may be a constant stored in the vehicle controller, as follows:

$$\text{Requested reel motor speed} = \text{requested reel speed} \times \text{reel motor to reel speed ratio}$$

For example, the vehicle controller may determine the requested reel motor speed if the requested reel speed is 799 and the reel motor to reel speed ratio is 1.5, as follows:

$$\text{Requested reel motor speed} = 799 \text{ rpm} \times 1.5 = 1198 \text{ rpm}$$

In block 116, the vehicle controller may provide a signal for the requested reel motor speed signal to the reel motor controller.

Figure 4:
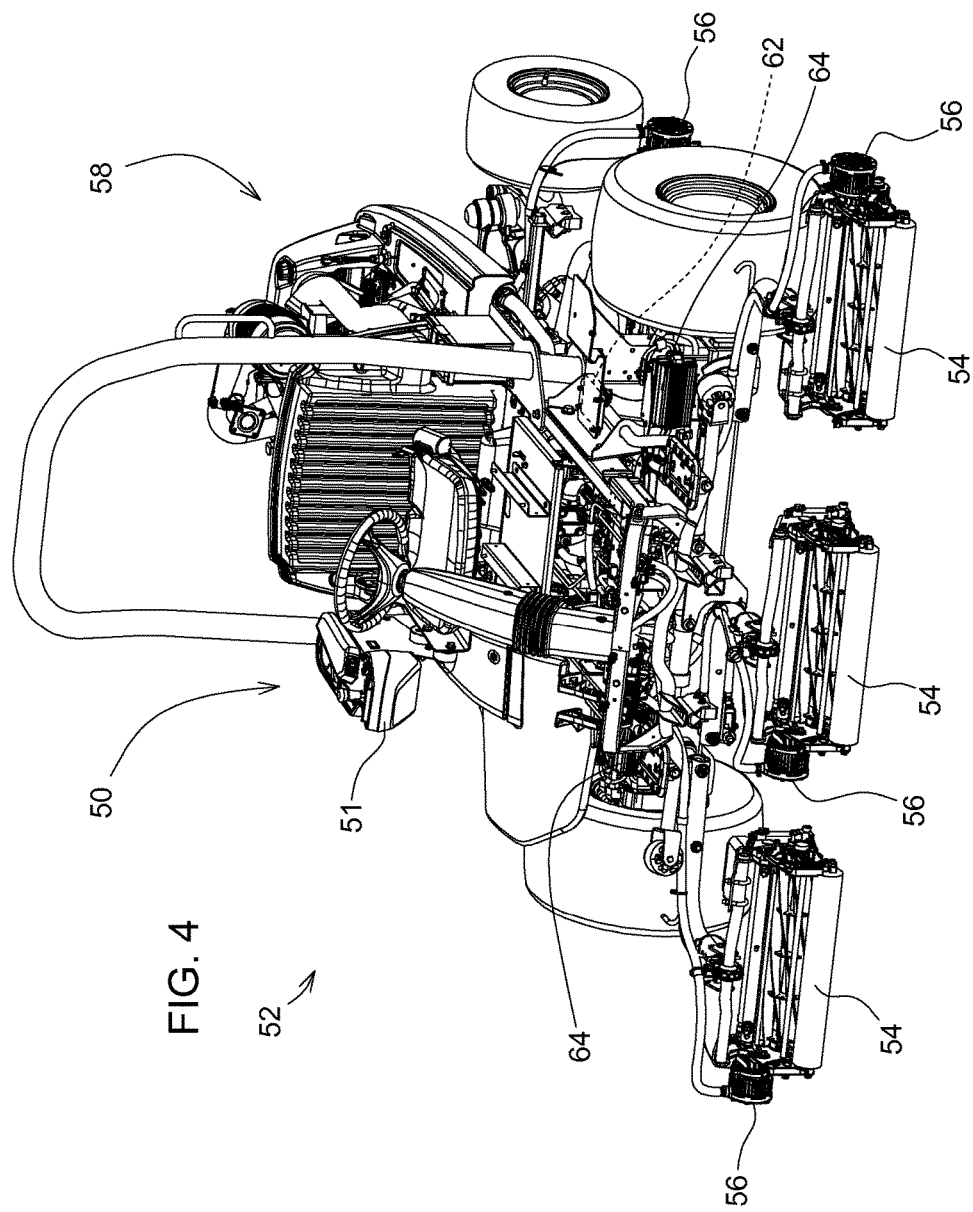
FIG. 4 is a perspective view of a fairway mower with a frequency of clip control system according to a second embodiment of the invention.
Figure 5:
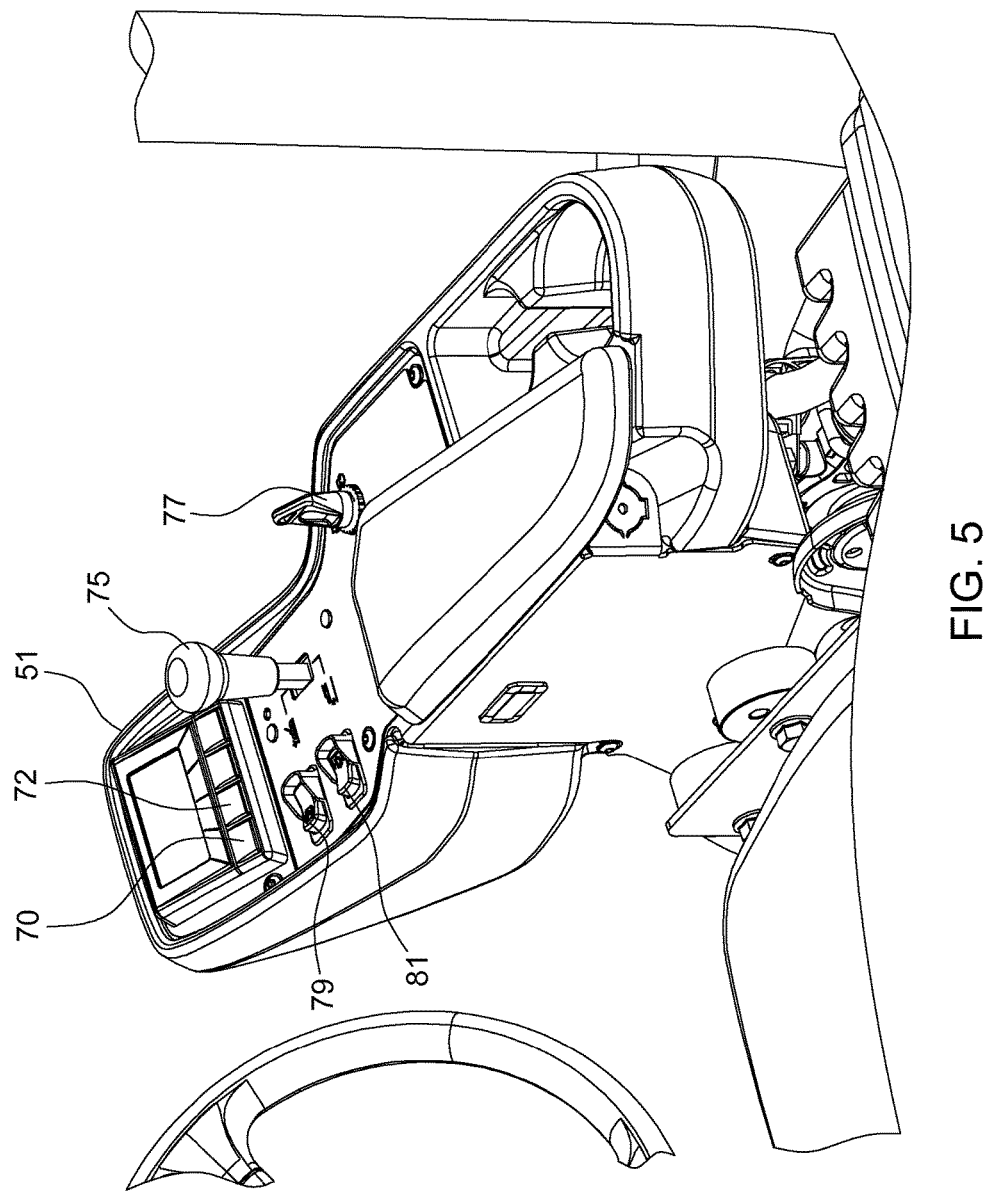
FIG. 5 is a perspective view of a control panel of a fairway mower with a frequency of clip control system according to a second embodiment of the invention.
Figure 6:
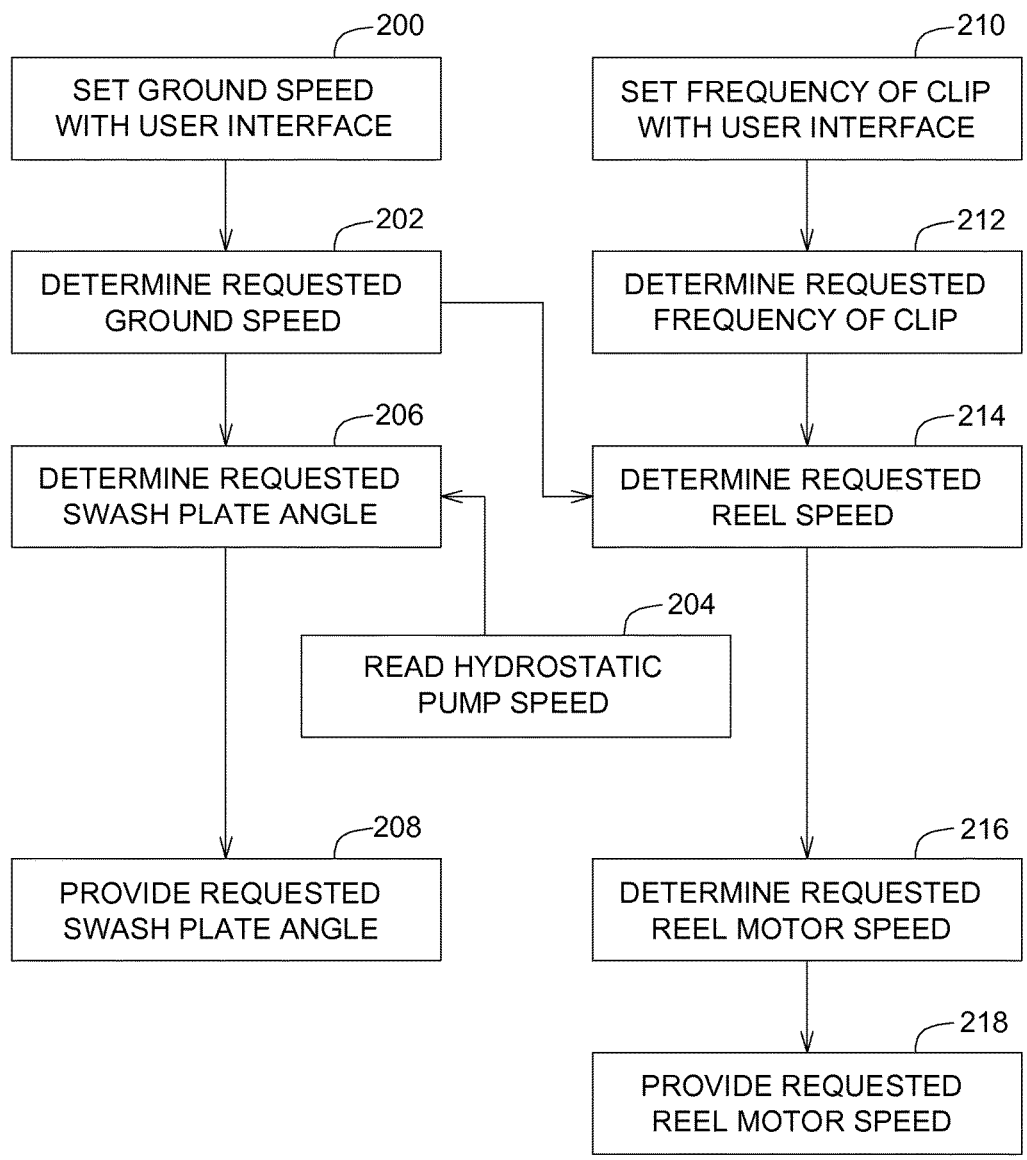
FIG. 6 is a block diagram of a frequency of clip control system on a fairway mower according to a second embodiment of the invention.

In a second embodiment shown in FIGS. 4-6, frequency of clip control system 50 is shown on fairway mower 52 having a plurality of reel mower cutting units 54 that may be rotated by electric reel motors 56, and a hydrostatic traction drive system. The fairway mower may be provided with internal combustion engine 58 or other power source and the hydrostatic traction drive system may transmit power from the engine or other power source to one or more traction drive wheels 60.

In a second embodiment, fairway mower 52 may include vehicle controller 62 and one or more reel motor controllers 64. Vehicle controller 62 may have one or multiple output drivers and embedded software which can implement the steps of the cutting reel speed control system. Each reel mower cutting unit 54 may have 7 or 11 reel blades, or any number of blades that may be a constant stored in vehicle controller 62 and/or each reel motor controller 64.

In a second embodiment, cutting reel speed control system 50 may include operator station 68 having ground speed user interface 70 and frequency of clip user interface 72 on control display 51. The control display also may include reel lift/lower control 75, ignition switch 77, park brake 79, and reel enable or PTO switch 81 to electrically engage or disengage the reel drive.

FIG. 6 is a block diagram showing the cutting reel speed control system for the fairway mower of FIGS. 4 and 5. In block 200, the operator may enter or request a ground speed setting using ground speed user interface 70. The ground speed user interface may provide a voltage to vehicle controller 62. For example, the user interface may include a potentiometer that can vary a voltage to the vehicle controller between a minimum of about 1 volt and a maximum of about 5 volts.

In a second embodiment, in block 202, the vehicle controller may determine the requested ground speed based on the voltage from block 200. A fairway mower may have a ground speed range between about 0 mph and about 12 mph. The vehicle controller may map the voltage from the ground speed user interface to a ground speed that is infinitely variable between the minimum and maximum.

In a second embodiment, in block 204, the vehicle controller may read the hydrostatic traction drive pump speed using a speed sensor that is integral to the hydrostatic pump. Alternatively, the vehicle controller may determine the hydrostatic drive pump speed from the engine speed and the pump drive ratio (which is 1.0 if the pump is directly coupled to the engine crankshaft).

In a second embodiment, in block 206, the vehicle controller may determine the requested swash plate angle based on the requested ground speed in block 202, hydrostatic pump speed in block 204, and other constants, as follows:

$$\text{Swash plate angle} = (63360 \text{ inches per mile}/60 \text{ min per hour}/6.28 \text{ radians per revolution}) \times (\text{maximum swash plate angle}/\text{pump speed}) \times (\text{requested ground speed}/(\text{pump to motor displacement ratio} \times \text{tire radius}))$$

For example, the vehicle controller may determine the requested swash plate angle for a requested ground speed of 6.4 mph from block 202, a pump to motor displacement ratio of 0.065, a tire radius of 12.1 inches, a pump speed of 2500 revolutions per minute, and a maximum swash plate angle of 17 degrees, as follows:

$$\text{Requested swash plate angle} = (63360 \text{ inches per mile}/60 \text{ min per hour}/6.28 \text{ radians per revolution}) \times (17 \text{ degrees}/2500 \text{ rpm}) \times (6.4 \text{ mph})/(0.065 \times 12.1 \text{ inches}) = 9.3 \text{ degrees}$$

The above equation may be used for pumps that have a linear relationship between flow and swash plate angle. If the relationship is not linear, the vehicle controller may use a look up table to determine requested swash plate angle.

In a second embodiment, in block 208, the vehicle controller may provide a requested swash plate angle which may be used as input to a partial integral derivative feedback loop to control the swash plate angle with a swash plate position sensor used as feedback.

In a second embodiment, in block 210, the operator may enter or request a frequency of clip setting using frequency of clip user interface 72. The frequency of clip user interface may provide a voltage to the vehicle controller. For example, the frequency of clip user interface may include a potentiometer that can vary the voltage to the vehicle controller between a minimum of about 1 volt and a maximum of about 5 volts.

In a second embodiment, in block 212, the vehicle controller may determine the requested frequency of clip based on the voltage from block 210. The vehicle controller may map the voltage from the frequency of clip user interface to one of several frequency of clip presets as described above in the first embodiment.

In a second embodiment, in block 214, the vehicle controller may determine the requested reel speed based on the requested ground speed from block 202, the requested frequency of clip from block 212, and one or more other numerical constants specific to the reel mower cutting unit or variables entered by the operator, such as the number of reel blades on the cutting unit. For example, the vehicle controller may determine the required reel speed of a fairway mower in revolutions per minute using the following equation:

Requested reel speed=((63360 inches per mile/60 min per hour)×requested ground speed)/number of reel blades×requested frequency of clip)

The vehicle controller may determine the requested reel speed based on a requested ground speed of 6.4 mph from block 102, a requested frequency of clip of 0.425 inches from block 212, and a cutting unit having 7 reel blades, as follows:

Requested reel speed=((63360 inches per mile/60 min per hour)×6.4 mph)/(7 blades×0.425 inches)=2272 rpm In a second embodiment, in block 216, the vehicle controller may determine the requested reel motor speed based on the requested reel speed from block 214 and the reel motor to reel speed ratio which may be a constant stored in the vehicle controller, as follows:

Requested reel motor speed=requested reel speed× reel motor to reel speed ratio

For example, the vehicle controller may determine the requested reel motor speed if the requested reel speed is 2272 rpm and the reel motor to reel speed ratio is 1.5, as follows:

Requested reel motor speed=2272 rpm×1.5 =3408 rpm

In block 218, the vehicle controller may provide a requested reel motor speed signal to the reel motor controllers.

The frequency of clip control system sets the speed of an electric reel motor based on requested ground speed based on the output of a ground speed user interface and requested frequency of clip based on the output of a frequency of clip user interface, along with the number of cutting blades of a cutting reel rotated by the electric reel motor, and a reel motor to reel speed ratio. The frequency of clip control system does not require a ground speed sensor, but provides the requested reel motor speed to one or more cutting reels without any ground speed feedback.

Having described a preferred embodiment, it will become apparent that various modifications can be made without departing from the scope of the invention as defined in the accompanying claims.

The invention claimed is:

1. A frequency of clip control system, comprising: a vehicle controller receiving an output from a ground speed user interface for a requested ground speed, and an output from a frequency of clip user interface for a requested frequency of clip; the vehicle controller setting the speed of an electric reel motor for the requested frequency of clip based on the requested ground speed without monitoring the actual ground speed.

2. The frequency of clip control system of claim 1 wherein the vehicle controller sets the speed of an electric traction drive motor.

3. The frequency of clip control system of claim 1 wherein the vehicle controller sets a swash plate angle of a pump for a hydrostatic traction drive.

4. The frequency of clip control system of claim 1 wherein the ground speed user interface includes a potentiometer that provides a voltage to the vehicle controller.

5. The frequency of clip control system of claim 1 wherein the frequency of clip user interface includes a potentiometer that provides a voltage to the vehicle controller.

6. The frequency of clip control system of claim 1 wherein the vehicle controller sets the speed of a plurality of electric reel motors.

7. A frequency of clip control system, comprising: a vehicle controller setting the speed of an electric reel motor and an electric traction drive motor based on a first voltage from an operator interface for a requested ground speed, a second voltage from an operator interface for a requested frequency of clip; the vehicle controller setting the electric reel motor speed independently of any ground speed feedback.

8. The frequency of clip control system of claim 7 wherein the vehicle controller calculates the speed of the electric reel motor based in part on a number of reel blades on a cutting reel and a reel motor to reel speed ratio.

9. The frequency of clip control system of claim 7 wherein the traction drive motor rotates a traction drum.

10. The frequency of clip control system of claim 7 wherein the vehicle controller maps the voltage from the operator interface for a requested frequency of clip to one of a plurality of discrete frequency of clip settings.

11. The frequency of clip control system of claim 7 wherein the vehicle controller maps the voltage from the operator interface for a requested ground speed to one of a plurality of ground speed settings.

12. A frequency of clip control system, comprising: a frequency of clip control outputting a voltage corresponding to a requested frequency of clip and a ground speed control lever outputting a voltage corresponding to a requested ground speed; and
a vehicle controller determining a requested traction drive motor speed based on the requested ground speed without actual ground speed and providing the requested traction motor speed to a traction motor controller; and determining a requested reel speed based on the requested ground speed and the requested frequency of clip without actual ground speed, determining a requested reel motor speed based on the requested reel speed, and providing the requested reel motor speed to a reel motor controller.

13. The frequency of clip control system of claim 12 wherein the vehicle controller includes a map of voltages from the frequency of clip control to a plurality of discrete frequency of clip settings.

14. The frequency of clip control system of claim 12 wherein the vehicle controller includes a map of voltages from the ground speed control lever to a plurality of discrete ground speeds.

* * * * *